United States Patent
Song et al.

(10) Patent No.: US 12,081,285 B2
(45) Date of Patent: Sep. 3, 2024

(54) METHOD, APPARATUS, AND SYSTEM FOR INFORMATION TRANSMISSION IN PLC NETWORK

(71) Applicant: HUAWEI TECHNOLOGIES CO., LTD., Guangdong (CN)

(72) Inventors: Kuichao Song, Nanjing (CN); Yuefeng Wu, Nanjing (CN); Chao Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 17/741,443

(22) Filed: May 11, 2022

(65) Prior Publication Data
US 2022/0271795 A1 Aug. 25, 2022

Related U.S. Application Data

(63) Continuation of application No. PCT/CN2020/128157, filed on Nov. 11, 2020.

(30) Foreign Application Priority Data

Nov. 11, 2019 (CN) .......................... 201911097619.8

(51) Int. Cl.
*H04B 3/54* (2006.01)
*H04B 3/56* (2006.01)

(52) U.S. Cl.
CPC ............... *H04B 3/542* (2013.01); *H04B 3/56* (2013.01); *H04B 2203/5433* (2013.01); *H04B 2203/5483* (2013.01)

(58) Field of Classification Search
None
See application file for complete search history.

(56) References Cited

U.S. PATENT DOCUMENTS

| | | | | |
|---|---|---|---|---|
| 3,909,821 A | * | 9/1975 | Jagoda ..................... | H04B 3/54 375/259 |
| 4,300,126 A | * | 11/1981 | Gajjar ............... | H02J 13/00009 340/310.17 |
| 4,686,382 A | * | 8/1987 | Shuey ..................... | H04B 3/56 307/104 |
| 7,245,472 B2 | * | 7/2007 | Davidow ................. | H04B 3/56 361/118 |

(Continued)

FOREIGN PATENT DOCUMENTS

| AU | 2017213582 B2 | 8/2019 |
|---|---|---|
| CN | 101267229 A | 9/2008 |

(Continued)

*Primary Examiner* — Fekadeselassie Girma
(74) *Attorney, Agent, or Firm* — Gregg Jansen

(57) ABSTRACT

Embodiments of this application disclose a method, an apparatus, and a system for information transmission in a PLC network. A switch control apparatus in embodiments of this application includes a switch and a coupling circuit. The coupling circuit is connected in parallel to two ends of the switch. When the switch is open, the coupling circuit transmits a first power line communication (PLC) signal to a gateway device. In embodiments of this application, when the switch is open, the PLC signal may be sent to the gateway device and information such as power off and tripping may be reported to the gateway device.

7 Claims, 9 Drawing Sheets

(56) References Cited

U.S. PATENT DOCUMENTS

| | | | | |
|---|---|---|---|---|
| 7,308,103 B2* | 12/2007 | Corcoran | H04L 9/08 | 455/445 |
| 7,321,291 B2* | 1/2008 | Gidge | H04J 14/02 | 340/310.17 |
| 7,715,534 B2* | 5/2010 | Binder | H04M 7/0003 | 379/93.08 |
| 7,761,079 B2* | 7/2010 | Mollenkopf | H04B 3/542 | 370/398 |
| 7,795,994 B2* | 9/2010 | Radtke | H04B 3/56 | 340/310.17 |
| 7,852,874 B2* | 12/2010 | Binder | H04L 67/00 | 370/502 |
| 7,873,058 B2* | 1/2011 | Binder | H04B 3/56 | 370/401 |
| 8,040,235 B2* | 10/2011 | Koga | H04B 3/54 | 375/257 |
| 8,749,097 B2* | 6/2014 | Azancot | H02J 7/00309 | 307/104 |
| 9,083,205 B2* | 7/2015 | Igata | H02J 13/00007 | |
| 10,056,943 B2* | 8/2018 | Dzung | H04B 3/56 | |
| 10,354,520 B2* | 7/2019 | Borisov | H04L 12/6418 | |
| 2004/0095204 A1* | 5/2004 | Cern | H04B 3/56 | 333/100 |
| 2006/0076830 A1* | 4/2006 | Hair | H04B 3/54 | 340/310.11 |
| 2007/0052532 A1* | 3/2007 | Berkman | H04B 3/54 | 340/538 |
| 2008/0224536 A1* | 9/2008 | Yamazaki | H04B 3/56 | 307/1 |
| 2009/0085726 A1* | 4/2009 | Radtke | H04B 3/56 | 375/258 |
| 2012/0327989 A1* | 12/2012 | Zhang | H04B 3/56 | 375/224 |
| 2014/0032005 A1 | 1/2014 | Iwamura | | |
| 2017/0201244 A1 | 7/2017 | Kerr | | |
| 2018/0013292 A1* | 1/2018 | White | H04B 3/54 | |
| 2018/0109290 A1* | 4/2018 | Fiorelli | H03H 7/004 | |

FOREIGN PATENT DOCUMENTS

| | | |
|---|---|---|
| CN | 106656271 A | 5/2017 |
| WO | 2015136682 A1 | 9/2015 |

* cited by examiner

METHOD, APPARATUS, AND SYSTEM FOR INFORMATION TRANSMISSION IN PLC NETWORK

CROSS-REFERENCE TO RELATED APPLICATIONS

This application is a continuation of International Application No. PCT/CN2020/128157, filed on Nov. 11, 2020, which claims priority to Chinese Patent Application No. 201911097619.8, filed on Nov. 11, 2019. The disclosures of the aforementioned applications are hereby incorporated by reference in their entireties.

TECHNICAL FIELD

Embodiments of this application relate to the communication field, and in particular, to a method, an apparatus, and a system for information transmission in a power line communication (PLC) network.

BACKGROUND

With an in-depth market-oriented reform of the power industry and rapid development of the power Internet of Things, currently, the State Grid is extensively constructing the power Internet of Things. In the power distribution field, proactive reporting of information about a power-off event by a low-voltage device has become an important goal for the State Grid to extensively construct the power Internet of Things. For a long time, a technology that the low-voltage device proactively detects and reports the power-off event helps a power supply department obtain power-off information before a user reports the power-off event, and use an edge computing data analysis capability to analyze a fault and restore power supply, thereby improving operation and maintenance efficiency of the State Grid. In addition, the low-voltage device has been intelligently reconstructed, and a communication manner of the low-voltage device may be a power line communication (PLC) manner, a radio frequency (RF) manner, or a dual-mode communication manner combining the PLC manner and the RF manner. Therefore, all switches in a local communication domain in a distribution network are equipped with communication modules.

Currently, a method for transmitting information about a power-off event in the conventional technology uses the power-off reporting technology when the power-off event occurs. For a specific schematic diagram, refer to FIG. 1. When a switch A1 trips due to overcurrent or leakage of electricity, meters located below the switch A1 are powered off. The meters shown in FIG. 1 are installed with PLC communication modules, in other words, all the meters affected by tripping of the A1 switch report information about a power-off event to a gateway device by using the PLC communication modules. Then, the gateway device determines a power-off area, a fault location, and the like based on the reported information about the power-off event.

However, the method for reporting the information about the power-off event in the conventional technology may have the following disadvantages: When the switch A1 is open due to a short circuit or overload of a load on a user side, if other switch devices on a same line as A1, such as B1 and C1, are open, the generated information about the power-off event cannot be transmitted to the gateway device. Consequently, the meters cannot report information about power-off events corresponding to B1 and C1 to the gateway device in the PLC communication manner.

SUMMARY

This application provides a method, an apparatus, and a system for information transmission in a PLC network. When a switch is open, a PLC signal may also be sent to a gateway device, and information such as power off and tripping may be reported to the gateway device.

According to a first aspect, this application provides a switch control apparatus, including a switch and a coupling circuit, where the coupling circuit is connected in parallel to two ends of the switch. The coupling circuit is configured to: when the switch is open, transmit a first PLC signal to a gateway device.

When the switch is open, an event such as tripping or power off may occur on the switch control apparatus. In this case, the switch control apparatus may transmit, to the gateway device through the coupling circuit, the first PLC signal sent by a PLC module of a meter located below the switch control apparatus or of another apparatus. The first PLC signal may include information such as tripping, power off, and a fault, and may further include information such as meter data and a meter log.

With reference to the first aspect, in a first implementation of the first aspect, the switch is configured to: when the switch is closed, transmit a second PLC signal to the gateway device.

When the switch is closed, there are two possibilities. One possibility is that both the meter and the apparatus in a PLC network work normally, and the second PLC signal is normally transmitted to the gateway device by using the switch. In this case, the second PLC signal generally carries the information such as the meter data and the meter log. Another possibility is that the event such as power off or tripping occurs on the meter located below the switch control apparatus or the another apparatus. The second PLC signal includes the information such as tripping, power off, and the fault, and may further include the information such as the meter data and the meter log.

According to the switch control apparatus provided in this application, the coupling circuit connected in parallel to the switch is disposed, so that when the switch is open or closed, a PLC signal may be sent to the gateway device through different transmission channels, to transmit various types of information carried in the PLC signal. In this way, communication reliability of the PLC network is improved.

With reference to the first aspect or the first implementation of the first aspect, in a second implementation of the first aspect, the switch control apparatus further includes a PLC module. The PLC module is connected in parallel to one end of the coupling circuit, and the PLC module is connected in parallel to one end of the switch. The PLC module is configured to send a third PLC signal to the gateway device.

When the switch control apparatus includes the PLC module, the switch control apparatus has a PLC communication function. Once the event such as the fault, power off, or tripping occurs on the switch control apparatus, the switch control apparatus may send the third PLC signal to the gateway device in a timely manner, thereby improving communication efficiency. In this case, the third PLC signal may include information such as a switch status, tripping, power off, and the fault.

With reference to any one of the first aspect, the first implementation of the first aspect, and the second implementation of the first aspect, in a third implementation of the first aspect, the coupling circuit includes a signal transformer and at least six safety capacitors. The at least six safety capacitors are configured to select a PLC signal of a specific frequency band, and the signal transformer is used to couple the selected PLC signal.

When the switch in the switch control apparatus is open, the at least six safety capacitors may select the PLC signal of the specific frequency band, but a relatively high surge voltage is generated when the switch is open. Therefore, the selected PLC signal is coupled by using the signal transformer, so that a voltage withstand capability of the coupling circuit may be improved. In this way, reliability of the coupling circuit is improved.

According to a second aspect, this application provides a method for information transmission. The method is applied to a first switch control apparatus, the first switch control apparatus includes a switch and a coupling circuit, and the coupling circuit is connected in parallel to two ends of the switch. The method includes: when the switch is open, transmitting a first PLC signal to a gateway device through the coupling circuit.

With reference to the second aspect, in a first implementation of the second aspect, when the switch is closed, a second PLC signal is transmitted to the gateway device by using the switch.

When the switch is open, an event such as tripping or power off may occur on the first switch control apparatus. In this case, the first switch control apparatus may transmit, to the gateway device through the coupling circuit, the first PLC signal sent by a PLC module of a meter located below the switch control apparatus or of another apparatus. The first PLC signal may include information such as tripping, power off, and a fault, and may further include information such as meter data and a meter log.

When the switch is closed, there are two possibilities. One possibility is that both the meter and the apparatus in a PLC network work normally, and the second PLC signal is normally transmitted to the gateway device by using the switch. In this case, the second PLC signal generally carries the information such as the meter data and the meter log. Another possibility is that the event such as power off or tripping occurs on the meter located below the switch control apparatus or the another apparatus. The second PLC signal includes the information such as tripping, power off, and the fault, and may further include the information such as the meter data and the meter log.

According to the method for information transmission provided in this application, when the switch is open or closed, a PLC signal may be sent to the gateway device through different transmission channels, to transmit various types of information carried in the PLC signal. In this way, communication reliability of the PLC network is improved.

With reference to either the second aspect or the first implementation of the second aspect, in a second implementation of the first aspect, the method is applied to a second switch control apparatus. The second switch control apparatus includes a PLC module, the PLC module is connected in parallel to one end of the coupling circuit, and the PLC module is connected in parallel to one end of the switch. The method for information transmission further includes: sending a third PLC signal to the gateway device by using the PLC module, where the third PLC signal includes a first address identifier corresponding to the switch control apparatus.

When the switch control apparatus includes the PLC module, in other words, the switch control apparatus has a PLC communication function, once the event such as the fault, power off, or tripping occurs on the switch control apparatus, the switch control apparatus may send the third PLC signal to the gateway device in a timely manner, thereby improving communication efficiency. In this case, the third PLC signal may include information such as a switch status, tripping, power off, and the fault.

With reference to the second implementation of the second aspect, in a third implementation of the second aspect, a first broadcast message broadcast by the second switch control apparatus may be received, where the first broadcast message includes power-off information. Then, a report message is sent to the gateway device in a unicast manner, where the report message carries a second address identifier corresponding to the second switch control apparatus. When an acknowledgment message returned by the gateway device is received, a first reply message is broadcast, where the acknowledgment message carries the second address identifier, and the first reply message carries the second address identifier.

The first broadcast message that is broadcast by the second switch control apparatus and that includes the power-off information is received. The report message that carries the second address identifier is sent to the gateway device in the unicast manner. Then, the first reply message is broadcast by the second switch control apparatus based on the acknowledgment message returned by the gateway device. In this way, at least one switch control apparatus may determine, based on the first reply message, whether the first broadcast message including the power-off information needs to be further broadcast, so that repeated reporting of same power-off information is reduced, a bandwidth resource is saved, and information transmission efficiency is improved.

With reference to the third implementation of the second aspect, in a fourth implementation of the second aspect, when the switch is open, a second broadcast message is broadcast, where the second broadcast message includes the first address identifier; a second reply message broadcast by a third switch control apparatus is received; and if the second address identifier exists in the second reply message, skip sending the second broadcast message; or if the second address identifier does not exist in the second reply message, the second broadcast message is broadcast.

When the switch in the switch control apparatus is open, the second broadcast message may be broadcast to the gateway device, and the second reply message is received. Then, it is determined, based on the second reply message, whether the second broadcast message needs to be further sent, so that the repeated reporting of the same power-off information is reduced, the bandwidth resource is saved, and information transmission efficiency is improved.

With reference to the fourth implementation of the second aspect, in a fifth implementation of the second aspect, after the second reply message broadcast by the third switch control apparatus is received, the method for information transmission in this application further includes: first receiving a third broadcast message sent by the third switch control apparatus, where the third broadcast message includes a third address identifier corresponding to the third switch control apparatus; and if the third address identifier exists in the received second reply message, not sending the third PLC signal; or if the third address identifier does not exist in the received second reply message, broadcasting the third PLC signal.

The switch control apparatus may determine, by determining whether the third address identifier corresponding to the third switch control apparatus exists in the second reply message, whether the third PLC signal needs to be sent, so that the repeated reporting of the same power-off information is reduced, the bandwidth resource is saved, and information transmission efficiency is improved.

According to a third aspect, this application provides a power distribution network system, including: a user meter box, a branch box, a power distribution cabinet, a gateway device, and a power transformer, where the power transformer is used to provide power supply; the user meter box includes the switch control apparatus according to any one of the first aspect and the first implementation of the first aspect to the third implementation of the first aspect; the branch box includes the switch control apparatus according to any one of the first aspect and the first implementation of the first aspect to the third implementation of the first aspect; and the power distribution cabinet includes the switch control apparatus according to any one of the first aspect and the first implementation of the first aspect to the third implementation of the first aspect.

In the switch control apparatus provided in this application, when the switch is in an open state, the first PLC signal is transmitted to the gateway device through the coupling circuit in the switch control apparatus; or when the switch in the switch control apparatus is in a closed state, the second PLC signal is transmitted to the gateway device by using the switch in the switch control apparatus. The PLC signals all carry data information, so that the data information can be transmitted when the switch is in different states.

In addition, in the power distribution network system of this application, when a fault occurs on the power distribution network system, when the switch is open, the first PLC signal that carries the information such as power off, tripping, or the fault may be transmitted through the coupling circuit in the switch control apparatus. In this way, the first PLC signal may be sent to the gateway device in a PLC manner, thereby improving reliability of information transmission.

DESCRIPTION OF EMBODIMENTS

Embodiments of this application provide a method for information transmission, a switch control apparatus, and a related system, to send a first PLC signal to a gateway device, and transmit data information carried in the first PLC signal when a switch is open.

Figure 1:
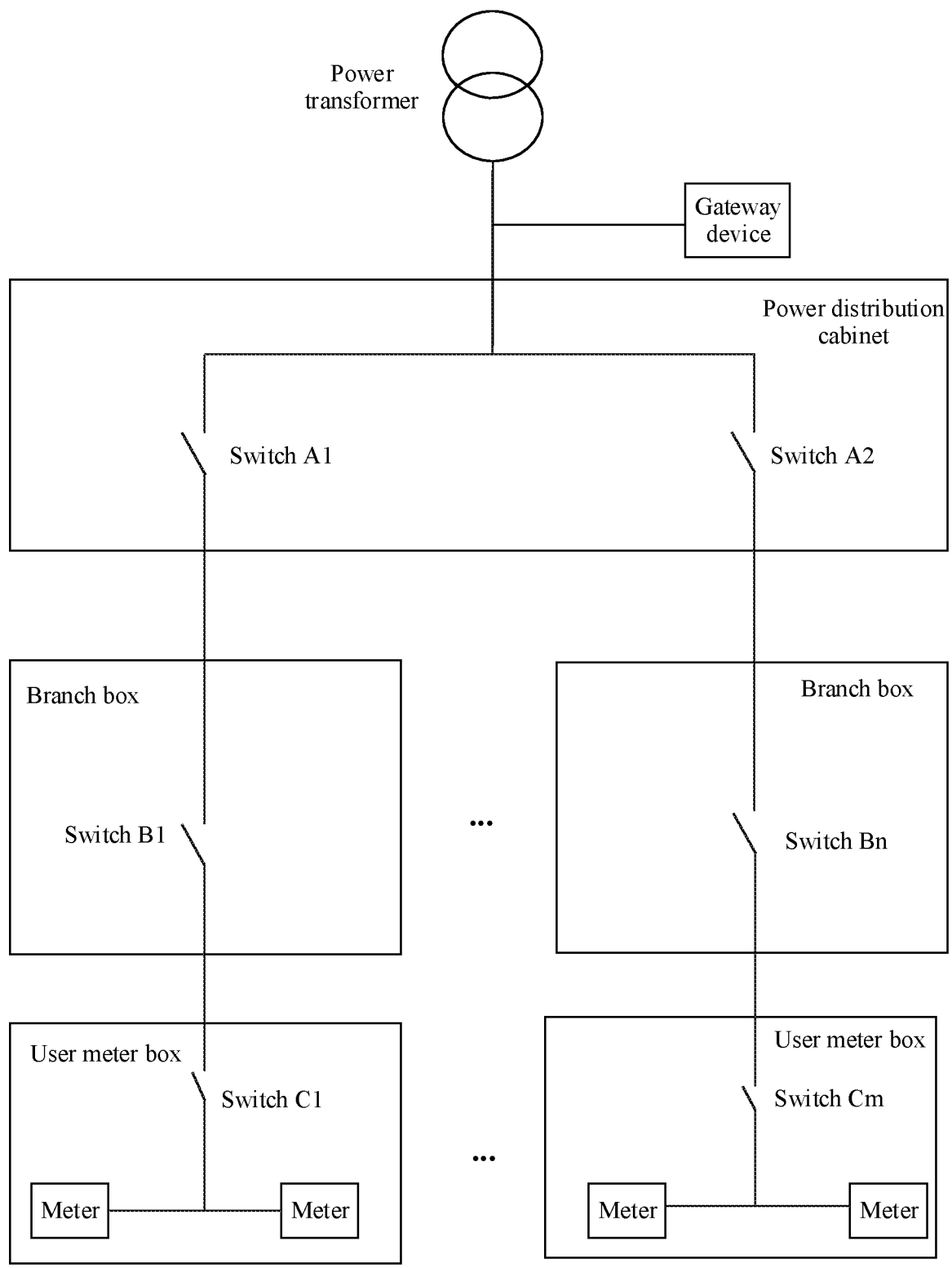
FIG. 1 is a diagram of a power distribution network system in the conventional technology.
Figure 2:
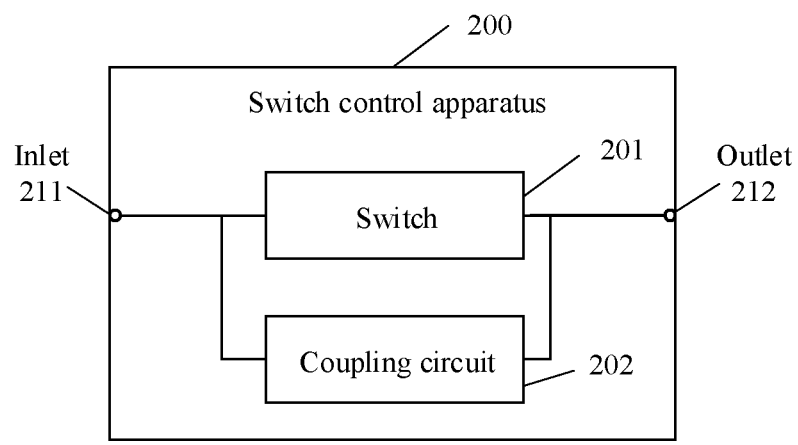
FIG. 2 is a diagram of a switch control apparatus according to an embodiment of this application.

The following describes the switch control apparatus provided in embodiments of this application. FIG. 2 is a diagram of a switch control apparatus 200 according to an embodiment of this application. The switch control apparatus 200 in this embodiment of this application includes: a switch 201 and a coupling circuit 202.

The coupling circuit 202 is connected in parallel to two ends of the switch 201.

Figure 7:
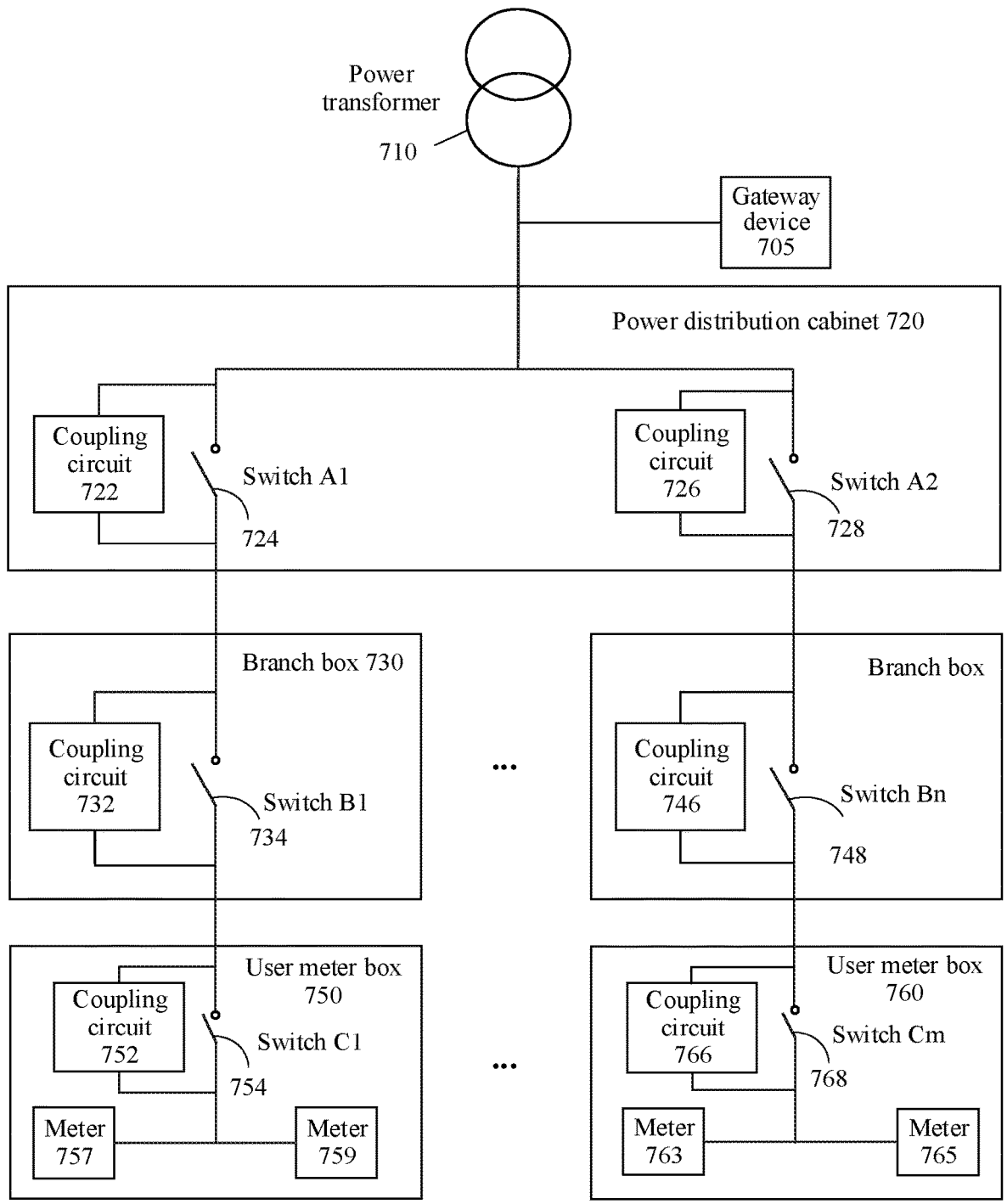
FIG. 7 is a diagram of a power distribution network system according to an embodiment of this application.
Figure 9:
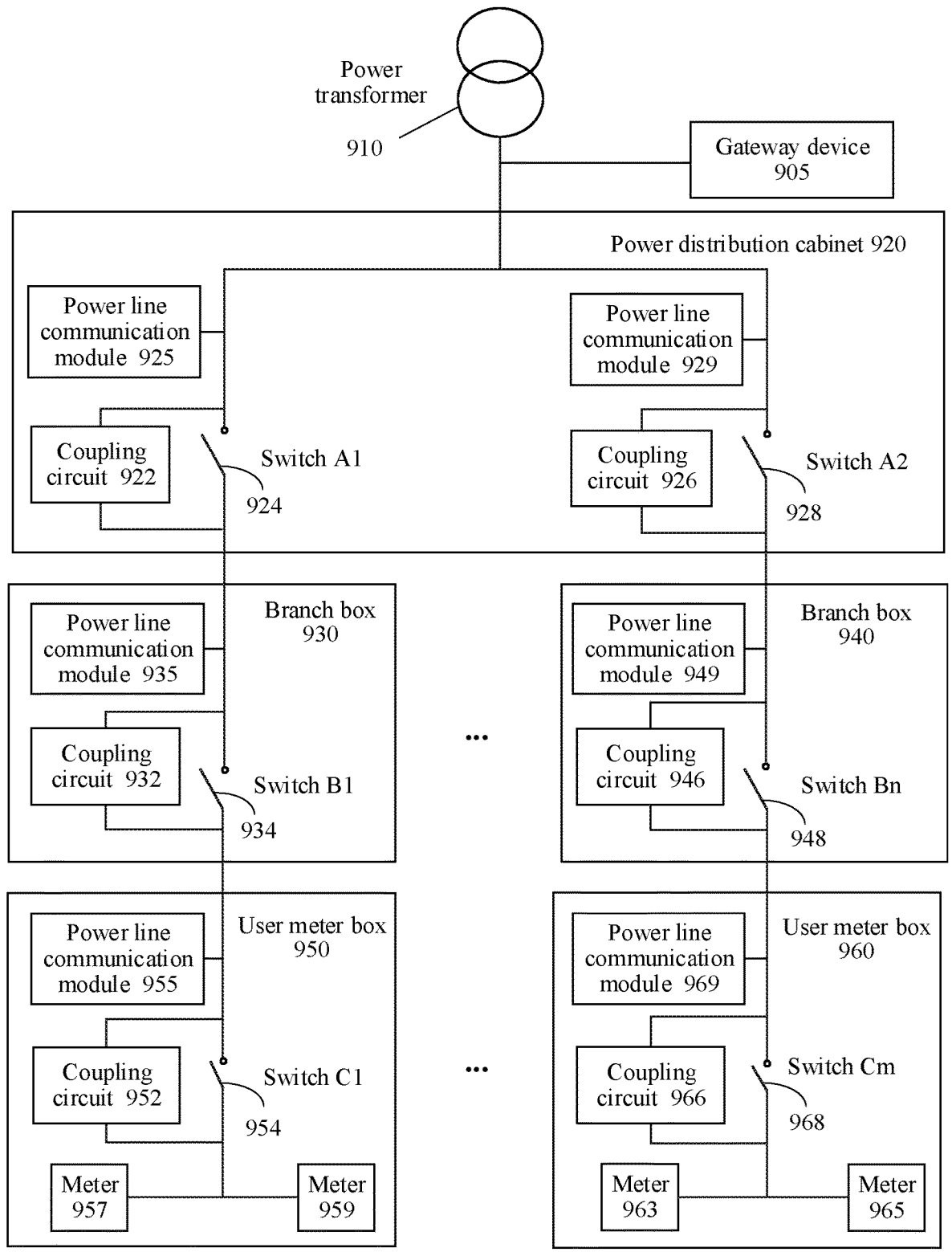
FIG. 9 is a diagram of another power distribution network system according to an embodiment of this application.

The switch 201 is configured to: when the switch 201 is closed, transmit a first power line communication PLC signal to a gateway device (not shown, see FIGS. 7 and 9).

The coupling circuit 202 is configured to: when the switch 201 is open, transmit a second PLC signal to the gateway device.

In this embodiment of this application, the coupling circuit 202 is a PLC coupling circuit. It should be noted that, in an actual application, another name may be used to replace a coupling circuit that performs a same function. This is not limited in this embodiment of this application. In addition, the gateway device may be an intelligent transformer terminal unit (TTU) or a data concentrator unit (DCU).

It may be understood that, in an actual application, a possible reason why the switch 201 is open is usually that the switch 201 is tripped due to overcurrent or leakage of electricity. Another possible reason why the switch 201 is open is that the switch 201 is not tripped, but a line is powered off. An open state is a state in which a current cannot pass through the switch 201 or data information cannot be transmitted by using the switch 201. This is not limited in this embodiment of this application.

Further, when the switch 201 is closed, there are two possibilities. One possibility is that both a meter and an apparatus in a PLC network work normally, and the second PLC signal is normally transmitted to the gateway device by using the switch 201. In this case, the second PLC signal generally carries information such as meter data and a meter log. Another possibility is that an event such as power off or tripping occurs on a meter located below the switch control apparatus 200 or another apparatus. The second PLC signal includes information such as tripping, power off, and a fault, and may further include the information such as the meter data and the meter log.

In this embodiment of this application, when the switch 201 in the switch control apparatus 200 is open, a PLC signal may be transmitted to the gateway device through a transmission channel constructed by the coupling circuit 202. In addition, a volume of the coupling circuit 202 is small, integration costs are relatively low, and reliability of a power supply system may be improved.

Figure 3:
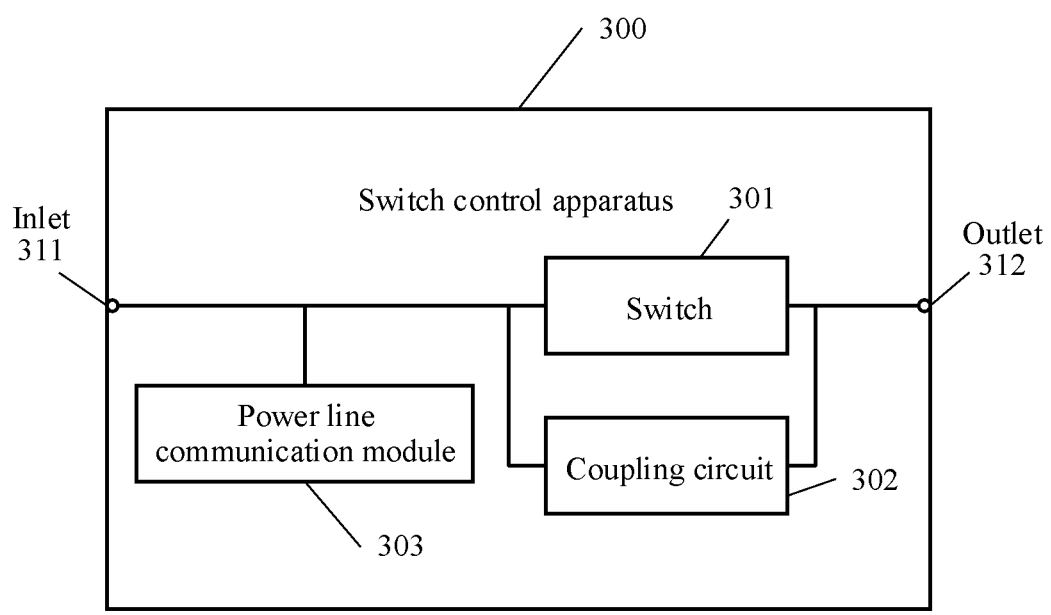
FIG. 3 is a diagram of another switch control apparatus according to an embodiment of this application.

FIG. 3 is a diagram of another switch control apparatus 300 according to an embodiment of this application. The switch control apparatus 300 in this embodiment of this application includes: a switch 301, a coupling circuit 302, and a PLC module 303.

The coupling circuit 302 is connected in parallel to the two ends (inlet and outlet ends) of the switch 301.

The PLC module 303 is connected to one end of the coupling circuit 302, and the PLC module is connected to a wire inlet end of the switch 301. In some embodiments, the PLC module 303 is connected in parallel to one end of the coupling circuit 302, and is further connected in parallel to a wire inlet end of the switch 301.

The switch 301 is configured to: when the switch 301 is closed, transmit the first PLC signal to the gateway device.

The coupling circuit 302 is configured to: when the switch 301 is open, transmit the second PLC signal to the gateway device.

The PLC module 303 is configured to send a third PLC signal to the gateway device, where the third PLC signal includes a first address identifier corresponding to a switch control apparatus 300.

Figure 4:
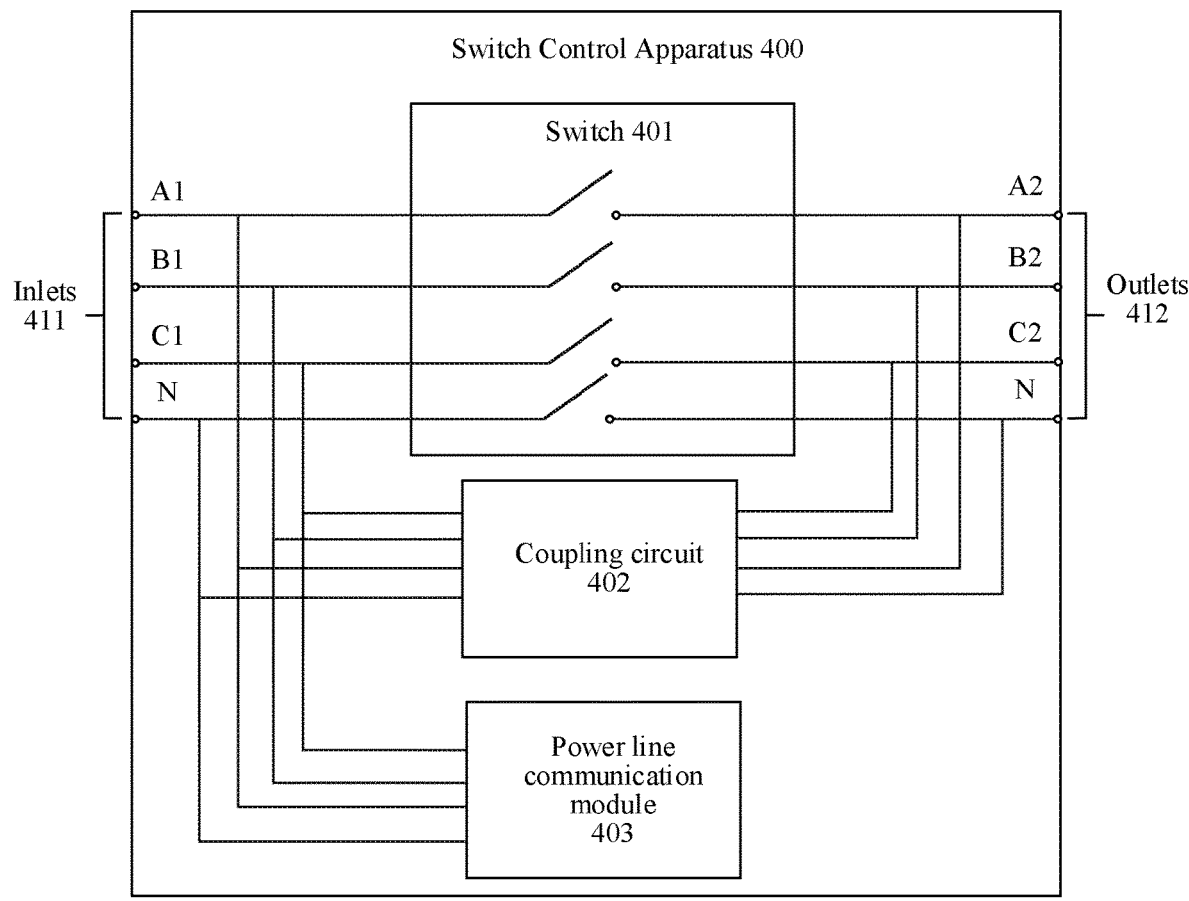
FIG. 4 is a diagram of still another switch control apparatus according to an embodiment of this application.

FIG. 4 is a diagram of still another switch control apparatus 400 according to an embodiment of this application. The switch control apparatus 400 includes switch 401, coupling circuit 402, and power line communication (PLC) module 403. A1, A2, B1, B2, C1, and C2 are phase lines, and N is a neutral line. When the switch 401 is closed, a PLC signal is transmitted from A1, B1, and C1 to A2, B2, and C2 by using the switch 401. When the switch 401 is open, the PLC signal is transmitted from inlets A1, B1, and C1 411 to outlets A2, B2, and C2 412 through the coupling circuit 402. In addition, because the power line communication module 403 is included, the switch control apparatus 400 has a PLC communication function, and the third PLC signal may be directly sent to the gateway device by using the power line communication module 403 when the switch 401 is in a closed state or in an open state. It may be understood that FIG. 4 is an example of a scenario in which the PLC module 403 is connected to the wire inlet end of the switch (i.e., inlets 411). In an actual application, the PLC module 403 may alternatively be connected to a wire outlet end (i.e., outlets 412) of the switch 401.

In this embodiment of this application, when the switch control apparatus 400 includes the PLC module 403, the switch control apparatus 400 includes the PLC communication function the switch control apparatus 400 may directly report power-off information to the gateway device without waiting for a meter to report the power-off information to the gateway device, thereby improving a fault feedback speed. In this case, the third PLC signal may include information such as a switch status, tripping, power off, and the fault.

Figure 5:
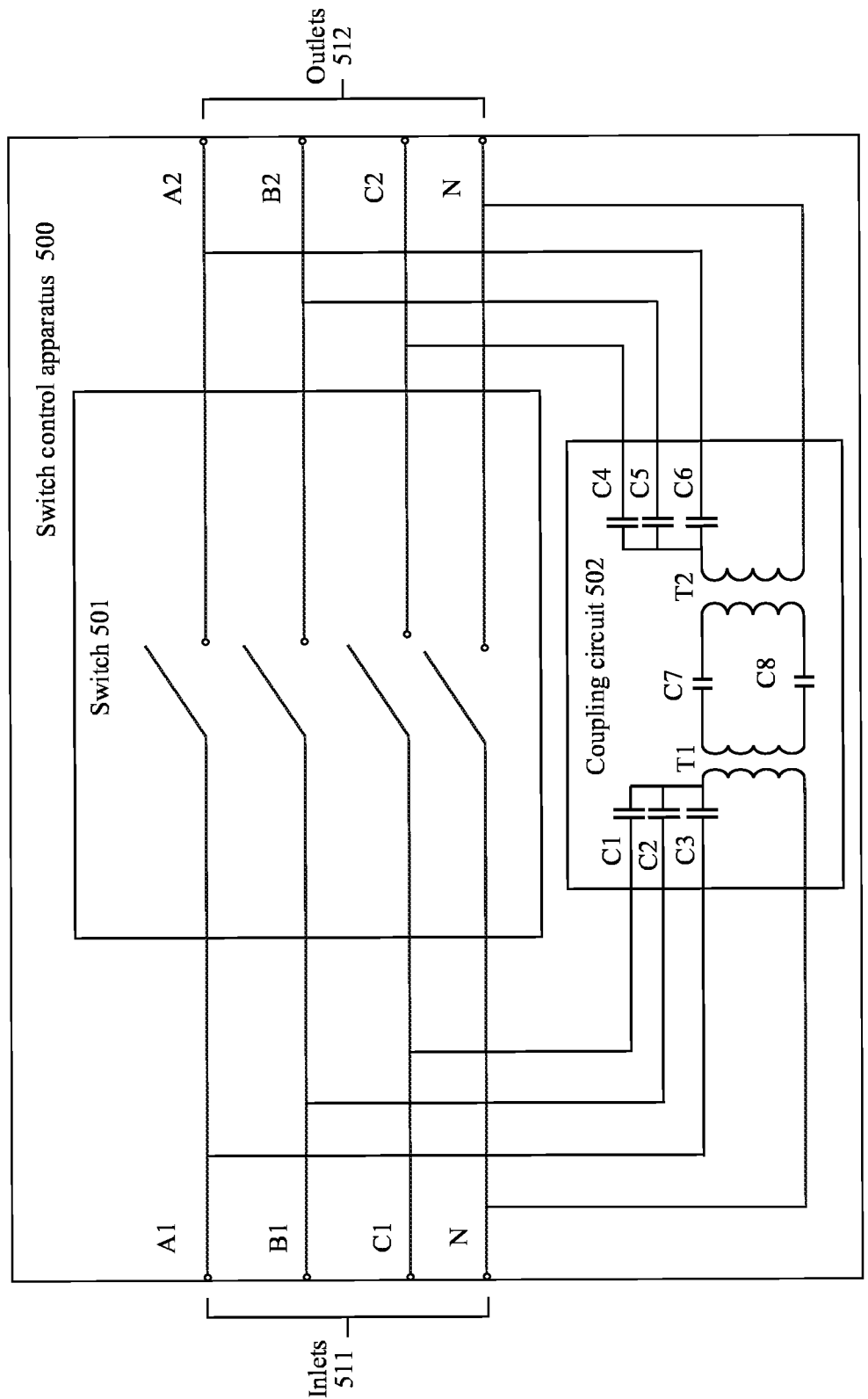
FIG. 5 is a diagram of a coupling circuit in a switch control apparatus according to an embodiment of this application.
Figure 6:
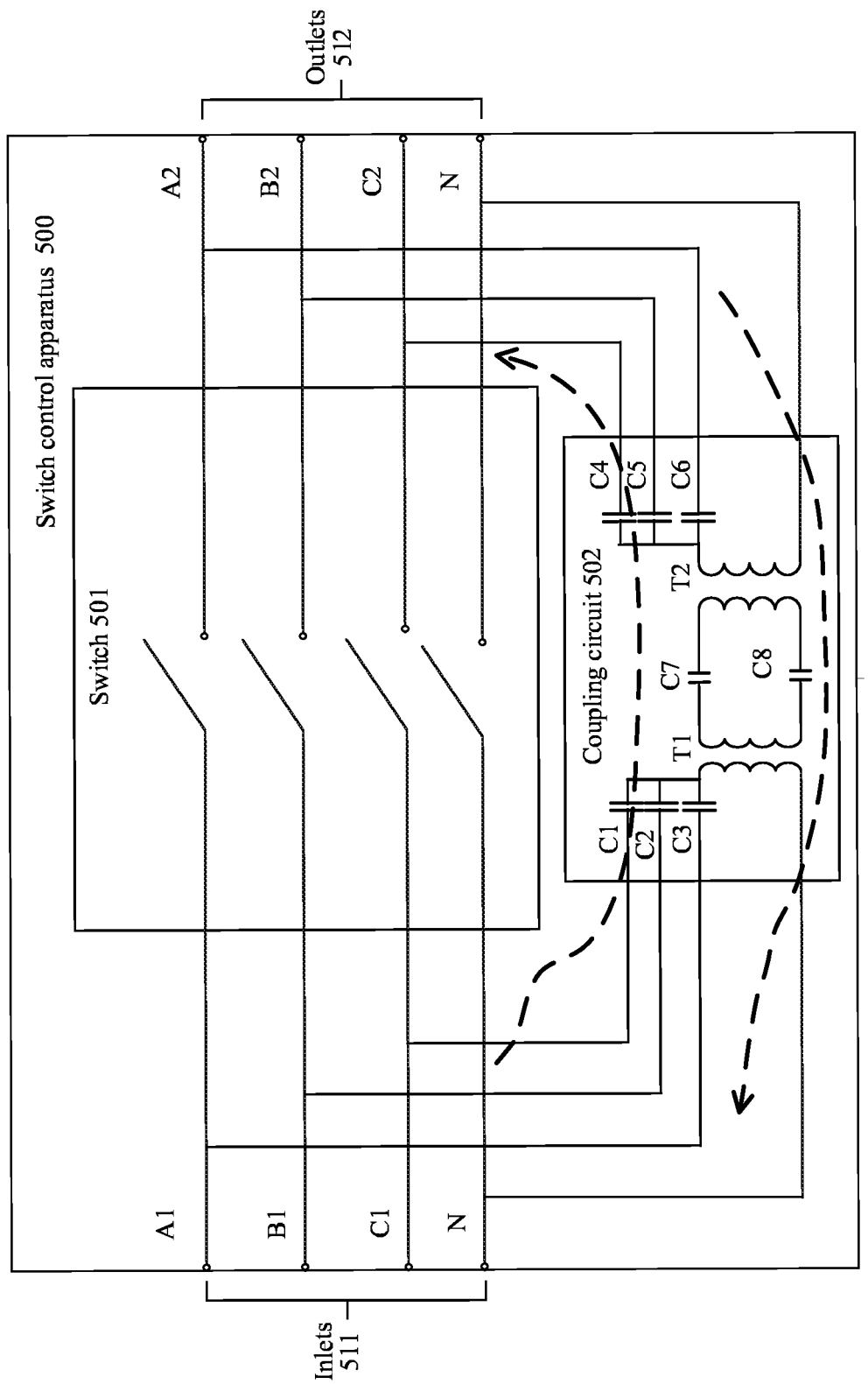
FIG. 6 is a diagram of a signal flow direction of a PLC signal in a switch control apparatus according to an embodiment of this application.

Optionally, the coupling circuit 202, 302, or 402 include signal transformers and safety capacitors (see FIGS. 5 and 6).

The safety capacitors are configured to select a PLC signal of a specific frequency band.

The signal transformers are used to couple the PLC signal.

FIG. 5 is a diagram of a coupling circuit 502 in a switch control apparatus 500 according to an embodiment of this application. As shown in FIG. 5, an example in which the coupling circuit 502 includes eight safety capacitors C1-C8 and two signal transformers T1 and T2 is used to describe the switch control apparatus provided in this application. Capacitors C1 to C8 are safety capacitors, T1 is a first signal transformer, T2 is a second signal transformer, A1, A2, B1, B2, C1, and C2 are (or indicate) phase wires, and N is a neutral line. It may be understood that a switch 501 shown in FIG. 5 is a four-pole switch in the embodiment shown. However, a three-pole switch may be alternatively used. Details are not described herein again. The three-pole switch 501 may perform an operation of a no-load line within a specific range, while the four-pole switch 501 may improve electrical safety during electrical maintenance. Therefore, the switch 501 in the switch control apparatus 500 may be a switch of different types in different application scenarios, thereby improving flexibility and selectivity of this solution.

Further, the coupling circuit 502 is connected in parallel to the switch 501, the safety capacitor C1 is connected to the inlet phase line C1, the safety capacitor C2 is connected to the inlet phase line B1, the safety capacitor C3 is connected to the inlet phase line A1, the safety capacitor C4 is connected to the outlet phase line C2, the safety capacitor C5 is connected to the outlet phase line B2, and the safety capacitor C6 is connected to the outlet phase line A2. The safety capacitor C7 and the safety capacitor C8 are connected to an inlet end of the first signal transformer T1 and to an outlet end of the second signal transformer T2, and N is connected to a neutral-wire busbar made from copper or a cable. When a switch contact in the switch control apparatus 500 is closed, in other words, when the switch 501 is in a closed state, a PLC signal is transmitted by using the switch 501 in the switch control apparatus 500. However, when the switch contact in the switch control apparatus 500 is open, in other words, when the switch 501 is in an open state, the safety capacitors C1 to C3 select a PLC signal of a specific frequency band to isolate other signals. The other signals may be main frequency alternating-current signals or other low-frequency signals. When the switch 501 is open, a relatively high surge voltage is generated at a wire inlet end and a wire outlet end of the coupling circuit 502. In this case, the first signal transformer T1 and the second signal transformer T2 in the coupling circuit 502 couple the PLC signal, to improve voltage withstand capabilities of the wire inlet end and the wire outlet end when the switch 501 is open, improve reliability of the coupling circuit 502, and improve reliability and feasibility of this embodiment.

FIG. 6 is a diagram of a signal flow direction of a PLC signal in a switch control apparatus 500 according to an embodiment of this application. As shown in FIG. 6, when the switch 501 is open, the PLC signal passes through the safety capacitors C1 to C3 from the wire inlet end 511 and is coupled to a second signal transformer T2 by using the first signal transformer T1. Then, the PLC signal passes through the safety capacitor C7 and the safety capacitor C8 and is coupled to the second signal transformer T2. Finally, the PLC signal is transmitted to the wire outlet end 512 after passing through the safety capacitors C4 to C6, to complete transmission of the PLC signal from the wire inlet end 511 to the wire outlet end 512. It may be understood that a PLC signal from a reverse direction may also be transmitted from the wire outlet end 512 to the wire inlet end 511 in a similar flow direction. Details are not described herein again.

When the switch 501 in the switch control apparatus 500 is open, the safety capacitors C1-C3 may select the PLC signal of the specific frequency band to be transmitted through the coupling circuit 502, and the relatively high surge voltage is generated when the switch 501 is open. The transformers T1 and T2 may couple the PLC signal, thereby improving a voltage withstand capability of the coupling circuit 502 and improving reliability of the coupling circuit 502.

The foregoing describes the switch control apparatus in various embodiments of this application. The following describes a power distribution network system in embodiments of this application. For details, refer to FIG. 7. FIG. 7 is a diagram of a power distribution network system 700 according to an embodiment of this application. The power distribution network system 700 includes user meter boxes 757, 759, 763, and 765, branch boxes 730 and 740, a power distribution cabinet 720, a gateway device 705, and a power transformer 710. The power transformer 710 is used to supply power.

The user meter box 750 includes a switch control apparatus similar to the switch control apparatus 200 of FIG. 2 and meters 757 and 759.

The branch box 730 or 740 includes a switch control apparatus similar to the switch control apparatus 200.

The power distribution cabinet 720 includes a switch control apparatus similar to the switch control apparatus 200.

Figure 8:
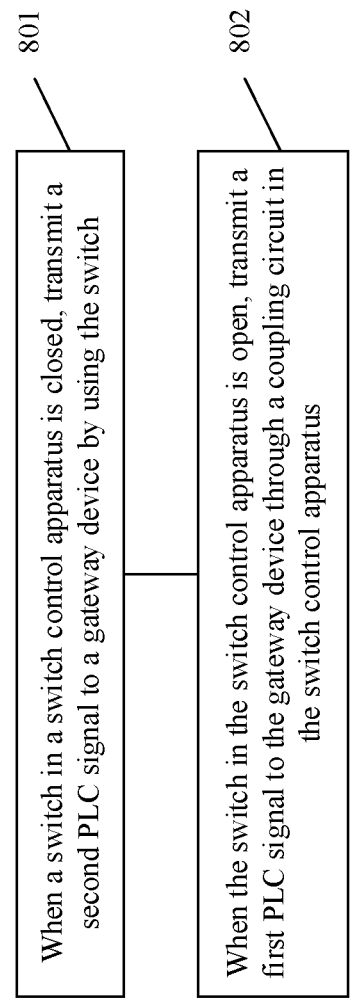
FIG. 8 is a flowchart of a method for information transmission according to an embodiment of this application.

For ease of understanding, refer to FIG. 8. FIG. 8 is a flowchart of a method for information transmission according to an embodiment of this application. Specifically, FIG. 8 is the method for information transmission based on the power distribution network system 700 shown in FIG. 7. A specific method is as follows.

Step 801: When a switch in the switch control apparatus is closed, transmit a second PLC signal to a gateway device by using the switch.

Step 802: When the switch in the switch control apparatus is open, transmit a first PLC signal to the gateway device through a coupling circuit in the switch control apparatus.

In this embodiment of this application, when the switch is open, the first PLC signal is transmitted to the gateway device through the coupling circuit. When the switch is closed, the second PLC signal is transmitted to the gateway device by using the switch.

For example, in the power distribution network system shown in FIG. 7, if a switch A1 724 in the power distribution cabinet 720 is in an open state, if a switch B1 734 in the branch box 730 is in an open state, and if a switch C1 754 in the user meter box 750 is also in an open state, the meters 757 and 759 on a line are powered off. In addition, first information is generated. The first information may include meter data, information about a power-off event, information about a tripping event, information about an abnormal event, user data, a message type, and address information, where the address information includes address information corresponding to the switch A1 724, the switch B1 734, and the switch C1 754. Because the switches A1 724, B1 734, and C1 754 are already in the open state, the first information generated by the meters 757 and 759 cannot be transmitted by using the switches A1 724, B1 734, and C1 754. Therefore, after detecting the power-off event, the meters first randomly wait for a period of time, and then detect an occupation status of a channel. If the channel is occupied, in other words, the channel in a non-idle state, the meters randomly wait for a period of time, and then detect the occupation status of the channel again. If the channel is idle, the first PLC signal is transmitted to the branch box through the coupling circuit 752 in the user meter box 750, then is transmitted to the power distribution cabinet through the coupling circuit 732 in the branch box 730, and finally is transmitted to the gateway device 705 through the coupling circuit 722 in the power distribution cabinet 720. In this way, reporting of the first information is completed, where the first PLC signal includes the first information.

For example, in the power distribution network system 700 shown in FIG. 7, if the switch A1 724 in the power distribution cabinet 720 is in a closed state, the switch B1 734 in the branch box 730 is in the open state, and the switch C1 754 in the user meter box 750 is in a closed state, the meters 757 and 759 on the line are powered off. In addition, second information is generated. In this case, the second information may include the meter data, the information about the power-off event, the information about the tripping event, the information about the abnormal event, the user data, the message type, and the address information, where the address information includes the address information corresponding to the switch B1 734. Because the switch B1 734 is in the open state, the second information generated by the meters 757 and 759 cannot be transmitted by using the switch B1 734. Therefore, the second PLC signal is transmitted to the branch box 730 by using the switch C1 754 in the user meter box 750, then is transmitted to the power distribution cabinet 720 through the coupling circuit 732 in the branch box 730, and finally is transmitted to the gateway device 705 by using the switch A1 724 in the power distribution cabinet 720. In this way, reporting of the second information is completed, where the second PLC signal includes the second information.

In this embodiment of this application, in the switch control apparatus, the information included in the PLC signals is transmitted to the gateway device through different transmission channels when the switches are in different states, thereby improving reliability and feasibility of this application.

FIG. 9 is a diagram of another power distribution network system 900 according to an embodiment of this application. The power distribution network system 900 includes the user meter boxes 950 and 960, the branch boxes 930 and 940, the power distribution cabinet 920, the gateway device 905, and the power transformer 910. The power transformer 910 is configured to provide a power supply.

The user meter boxes 950 and 960 each include a switch control apparatus similar to the switch control apparatus 300 of FIG. 3 and further include the meters 957, 959, 963, and 965.

The branch boxes 930 and 940 each include a switch control apparatus similar to the switch control apparatus 300.

The power distribution cabinet 920 includes a switch control apparatus similar to the switch control apparatus 300.

For ease of understanding, the following describes the method for information transmission based on the power distribution network system 900 shown in FIG. 9.

In this embodiment of this application, a third PLC signal may be directly sent to the gateway device 905 by using a PLC module in the switch control apparatus, and the third PLC signal includes a first address identifier corresponding to a switch control apparatus.

For example, in the power distribution network system 900 shown in FIG. 9, if a switch A2 928 is in an open state, a switch Bn 948 in the branch box 940 is in a closed state, and a switch Cm 968 in the user meter box 960 is in a closed state. In this case, the meters 963 and 965 are powered off, and the first information is generated. The first information is similar to the foregoing description, and details are not described herein again. The switch A2 928 generates the second information. Specifically, the second information is data information generated by the switch control apparatus when the switch in the switch control apparatus is in an open state. The second information may include the information about the power-off event, the information about the tripping event, the information about the abnormal event, and the message type. Then, after the second information is generated, the third PLC signal is directly sent to the gateway device 905 by using the PLC module 929.

In this embodiment of this application, when the switch control apparatus includes the PLC module, in other words, the switch control apparatus has a PLC communication function, the switch control apparatus may directly send the third PLC signal to the gateway device 905, thereby saving a resource for transmitting information for a plurality of times, and improving transmission efficiency. In addition, for the switch in the switch control apparatus, because a backup power unit exists in the PLC module, the switch may remain in a working state for a specific period of time after the switch is open, thereby improving reliability and feasibility of this application.

Optionally, that the third PLC signal is sent to the gateway device 905 by using the PLC module in the switch control apparatus may further include: receiving a first broadcast message broadcast by a second switch control apparatus, where the first broadcast message includes power-off information; sending a report message to the gateway device in a unicast manner, where the report message carries a second address identifier corresponding to the second switch control apparatus; and when an acknowledgment message returned by the gateway device is received, broadcasting a first reply message, where the acknowledgment message carries the second address identifier, and the first reply message carries the second address identifier.

For example, refer to FIG. 9. The switch control apparatus that includes the power line communication module in the power distribution network system shown in FIG. 9 is used as a node. When the switch in the switch control apparatus is in the closed state, the node is a non-power-off node. When the switch in the switch control apparatus is in the open state, the node is a power-off node.

Figure 10:
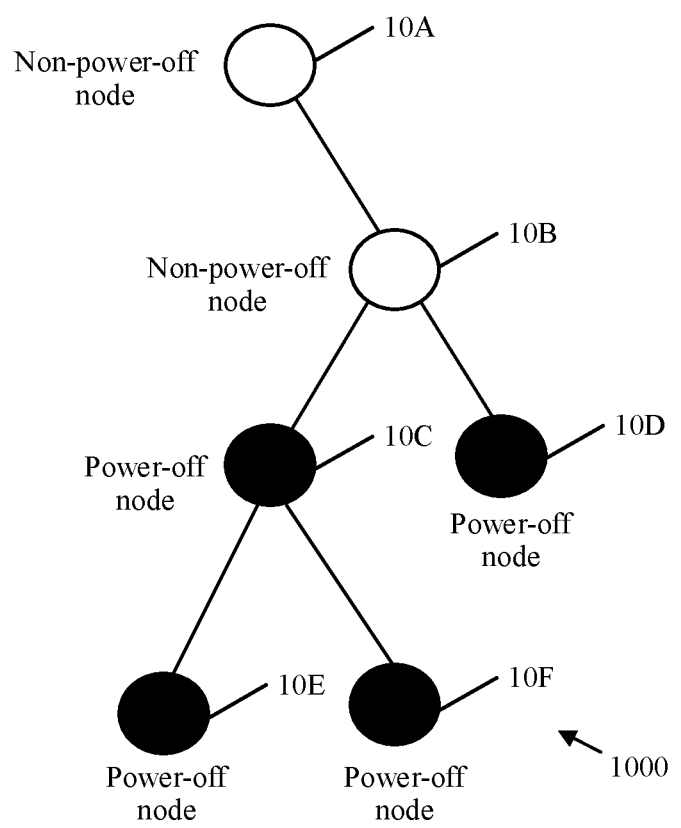
FIG. 10 is a node communication flow of a method for information transmission according to an embodiment of this application.

FIG. 10 is a node communication flow of a method for information transmission according to an embodiment of this application. 10A to 10F in FIG. 10 are nodes, where 10A and 10B are non-power-off nodes, and 10C to 10F are power-off nodes. It should be noted that information transmission between nodes is not classified based on a geographical location. In this embodiment of this application, signal strength is used for classification. To be specific, when the non-power-off node 10A in FIG. 10 is a gateway device, the non-power-off node 10B may be a switch control apparatus in a specific signal strength range of the gateway device. Based on FIG. 9, it can be learned that the non-power-off node 10B may be a switch control apparatus in which the switch A1 is located, or a switch control apparatus in which the switch B1 is located. Specific classification of a transmission upper level and a transmission lower level between nodes is not limited herein.

Further, an example in which the non-power-off node 10A is the gateway device is used. It can be learned from the foregoing description that a switch in the non-power-off node 10B, namely, the switch control apparatus, is in a closed state, and the non-power-off node 10B may receive the first broadcast message sent by either the power-off node 10C or the power-off node 10D. The first broadcast message may be a user datagram protocol (UDP) packet or an Internet protocol (IP) packet. Therefore, the first broadcast message includes a link layer header, an IPv6 (Internet protocol version 6) header, a UDP header, a power-off report message payload, and a link layer frame check. The IPv6 header further includes a source IPv6 address, a destination IPv6 address, and other fields in the IPv6 header. For the non-power-off node 10B, the source IPv6 address is an address corresponding to either the power-off node 10C or the power-off node 10D, and the destination IPv6 address is a broadcast address FF02::1. Different PLC technologies correspond to different formats of the link layer header. The format of the link layer header may be a link layer message authentication code (MAC) address corresponding to an IPv6 address or a short address bitmap of power-off nodes. Because when nodes access a network, the gateway device allocates a short address to each node, for example, a terminal equipment identifier (TEI). The TEI is usually of 12 bits, and the link layer header may use a TEI corresponding to the non-power-off node 10B and a TEI corresponding to the non-power-off node 10A to send the report message. The power-off report message payload may include a message type, a sequence number, a start short address, and the short address bitmap of the power-off nodes. In this embodiment of this application, a message type of the report message is power-off reporting, the start short address is a minimum value of a short address of a reporting node, and the sequence number is used to indicate a sequence number of the message. Each first broadcast message received by the non-power-off node 10B each time needs to carry a different sequence number. Because the first broadcast message may be forwarded for a plurality of times, by carrying the different sequence number, other nodes can remove a repeated message after repeatedly receiving the message. The short address bitmap of the power-off nodes is a bitmap starting from the address corresponding to either power-off node 10C or the power-off node 10D. Based on a short address of a different power-off node, a corresponding bit in the bitmap is set to "1". For example, a current maximum networking scale of an HPLC is 1024, in other words, 128 bytes are required in total, or 1024 bits are required in total. The 1024 bits may represent 1024 nodes.

Further, the non-power-off node 10B aggregates the second address identifier in the first broadcast message. An aggregation manner may be aggregation of the second address identifier on the first address identifier or direct stacked aggregation of the second address identifier on a previous second address identifier by using a bitmap. It should be noted that in this embodiment of this application, a bitmap manner is used as an example. In an actual application, the aggregation manner of the identifier is not limited.

The non-power-off node 10B may then send the report message to the non-power-off node 10A, where the report message may include the link layer header, the IPv6 header, the UDP header, the power-off report message payload, and the link layer frame check. The IPv6 header further includes the source IPv6 address, the destination IPv6 address, and the other fields in the IPv6 header. For the non-power-off node 10B, the source IPv6 address is an address corresponding to the non-power-off node 10B, and the destination IPv6 address is an address corresponding to the non-power-off node 10A. The link layer header may use the TEI corresponding to the non-power-off node 10B and the TEI corresponding to the non-power-off node 10A to send the report message. The power-off report message payload may include the message type, the sequence number, the start short address, and the short address bitmap of the power-off node. In this embodiment of this application, the message type of the report message is power-off reporting, the start short address is the minimum value of the short address of the reporting node, and the sequence number is used to indicate the sequence number of the message.

Still further, when the non-power-off node 10B receives the acknowledgment message returned by the non-power-off node 10A, the non-power-off node 10B sends the first reply message to either the power-off node 10C or the power-off node 10D. Specifically, the acknowledgment message includes the link layer header, the IPv6 header, the UDP header, the power-off report message payload, and the link layer frame check. The IPv6 header further includes the source IPv6 address, the destination IPv6 address, and the other fields in the IPv6 header. For the non-power-off node 10A, the source IPv6 address is the address corresponding to the non-power-off node 10A, the destination IPv6 address is the address corresponding to the non-power-off node 10B. The power-off report message payload may include the message type, the sequence number, the start short address, and the short address bitmap of the power-off node. A message type of the acknowledgment message is power-off acknowledgment. The first reply message includes the link layer header, the IPv6 header, the UDP header, the power-off report message payload, and the link layer frame check. The IPv6 header further includes the source IPv6 address, the destination IPv6 address, and the other fields in the IPv6 header. For the non-power-off node 10A, the source IPv6 address is the address corresponding to the non-power-off node 10B, and the destination IPv6 address is the broadcast address FF02::1. The power-off report message payload may include the message type, the sequence number, the start short address, and the short address bitmap of the power-off node. A message type of the first reply message is power-off acknowledgment.

In this embodiment of this application, when the switch in the switch control apparatus is closed, a second broadcast message sent by at least one switch control apparatus may be received, and a report message that carries the first address identifier corresponding to the second broadcast message is sent to the gateway device. Then, the first reply message that carries at least one first address identifier is sent to the at least one switch control apparatus based on the acknowledgment message sent by the gateway device, so that the at least one switch control apparatus may determine, based on the first reply message, whether to continue to send the second broadcast message. In this way, repeated reporting of same information is reduced, a bandwidth resource is saved, and information efficiency is improved.

Optionally, that the third PLC signal is sent to the gateway device by using the PLC module in the switch control apparatus may further include: when the switch is open, broadcasting the second broadcast message, where the second broadcast message includes the first address identifier corresponding to the switch control apparatus; receiving a second reply message broadcast by a third switch control apparatus; and if the second address identifier exists in the second reply message, skip continuing to send the second broadcast message; or if the second address identifier corresponding to the second reply message does not exist in the second reply information, continuing to broadcast the second broadcast message.

For example, refer to FIG. 10. The example in which the non-power-off node 10A is the gateway device is used. It can be learned from the foregoing description that the power-off node 10C, namely, the switch in the switch control apparatus, is in an open state; and then the power-off node 10C may send the second broadcast message to the non-power-off node 10B. The second broadcast message includes the link layer header, the IPv6 header, the UDP header, the power-off report message payload, and the link layer frame check. The IPv6 header further includes the source IPv6 address, the destination IPv6 address, and the other fields in the IPv6 header. For the power-off node 10C, the source IPv6 address is the address corresponding to the power-off node 10C, and the destination IPv6 address is the broadcast address FF02::1. The power-off report message payload may include the message type, the sequence number, the start short address, and the short address bitmap of the power-off node. In this embodiment of this application, a message type of the second broadcast message is power-off reporting, others are similar to the foregoing description, and details are not described herein again.

Further, when the non-power-off node 10B receives the acknowledgment message sent by the non-power-off node 10A, the non-power-off node 10B sends the second reply message to either the power-off node 10C or the power-off node 10D. After receiving the second reply message, the power-off node 10C may determine, based on the second reply message, whether the second address identifier exists in a short address bitmap of the power-off node in the second reply message. If the second address identifier exists, the power-off node 10C does not continue to send the second broadcast message to the non-power-off node 10B again. If the second address identifier does not exist, the power-off node 10C continues to send the second broadcast message to the non-power-off node 10B. The second reply message and the second broadcast message are similar to the foregoing description, and details are not described herein again.

In this embodiment of this application, when the switch of the switch control apparatus is open, the second broadcast information may be sent to the at least one switch control apparatus. After the at least one switch control apparatus receives the acknowledgment message sent by the gateway device, the second reply message that is sent by the at least one switch control apparatus and that carries the at least one first address identifier is received. In addition, whether the address identifier corresponding to the data information has been successfully reported to the network device is determined based on the second reply message. In this way, the repeated reporting of the same information is reduced, the bandwidth resource is saved, and information efficiency is improved.

Optionally, after the second reply message broadcast by the third switch control apparatus is received, the method for information transmission in this embodiment of this application may further include: receiving a third broadcast message sent by the third switch control apparatus, where the third broadcast message includes a third address identifier corresponding to the third switch control apparatus; and if the third address identifier exists in the second reply message, not sending the third PLC signal; or if the third address identifier does not exist in the second reply message, broadcasting the third PLC signal.

For example, refer to FIG. 10. The example in which the non-power-off node 10A is the gateway device is used. It can be learned from the foregoing description that the power-off node 10C to the power-off node 10F, namely, the switch in the switch control apparatus, are in an open state. When the power-off node 10C receives the third broadcast message sent by either the power-off node 10E or the power-off node 10F, the third broadcast message carries the link layer header, the IPv6 header, the UDP header, the power-off report message payload, and the link layer frame check. The IPv6 header further includes the source IPv6 address, the destination IPv6 address, and the other fields in the IPv6 header. For the power-off node 10C, the source IPv6 address is an address corresponding to either the power-off node 10E or the power-off node 10F, and the destination IPv6 address is the broadcast address FF02::1. The power-off report message payload may include the message type, the sequence number, the start short address, and the short address bitmap of the power-off node. In this embodiment of this application, a message type of the third broadcast message is power-off reporting. Others are similar to the foregoing description and details are not described herein again.

Further, the power-off node 10C aggregates the third address identifier corresponding to either the power-off node 10E or the power-off node 10F by using a bitmap. Because the second reply message sent by the non-power-off node 10B has been received, the power-off node 10C may determine, based on the second reply message, whether the third address identifier corresponding to either the power-off node 10E or the power-off node 10F exists in the short address bitmap of the power-off node in the second reply message. If the third address identifier exists, the third PLC signal is not sent to the non-power-off node 10B. If the third address identifier does not exist, the third PLC signal is sent to the non-power-off node 10B. The reply message is similar to the foregoing description, and details are not described herein again.

In this embodiment of this application, after receiving the third broadcast message sent by the third switch control apparatus, the switch control apparatus determines, by determining whether the third address identifier corresponding to the third switch control apparatus exists in the second reply message, whether the third PLC signal needs to be sent. In this way, the repeated reporting of the same information is reduced, the bandwidth resource is saved, and information efficiency is improved.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In embodiments provided in this application, it should be understood that the disclosed system, apparatus, and method may be implemented in other manners. For example, the described apparatus embodiments are merely examples. For example, division into the units is merely logical function division and may be other division during an actual implementation. For example, a plurality of units or components may be combined or integrated into another system, or some features may be ignored or may not be performed. In addition, the displayed or discussed mutual coupling or direct coupling or communication connection may be implemented through some interfaces. Indirect coupling or communication connection between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A method for information transmission, comprising:
   receiving a first PLC signal at a switch of a first switch control apparatus, the first switch control apparatus comprising the switch and a coupling circuit, the coupling circuit being connected in parallel to inlet and outlet ends of the switch;
   transmitting a first PLC signal through the coupling circuit to a gateway device when the switch is open or transmitting a second PLC signal to the gateway device using the switch when the switch is closed;
   receiving a third PLC signal in a second switch control apparatus, the second switch control apparatus comprising a second switch, a second coupling circuit connected in parallel to inlet and outlet ends of the second switch, and a PLC module connected to an inlet end of the second coupling circuit;
   sending a third PLC signal to the gateway device using the PLC module, the third PLC signal comprising a first address identifier corresponding to the first switch control apparatus;
   receiving a first broadcast message broadcast by the second switch control apparatus, the first broadcast message comprising power-off information;
   sending a report message to the gateway device in a unicast manner, the report message carrying a second address identifier corresponding to the second switch control apparatus; and
   broadcasting a first reply message when an acknowledgment message returned by the gateway device is received, the acknowledgment message carrying the second address identifier, and the reply message carrying the second address identifier.

2. The method according to claim 1, wherein the sending the third PLC signal to the gateway device using the PLC module comprises:
   broadcasting a second broadcast message when the switch is open, the second broadcast message comprising the first address identifier;
   receiving a second reply message broadcast by a third switch control apparatus; and
   skip continuing to send the second broadcast message if the second address identifier exists in the second reply message; or continue to broadcast the second broadcast message if the second address identifier does not exist in the second reply message.

3. The method according to claim 2, wherein after the receiving the second reply message broadcast by the third switch control apparatus, the method further comprising:
   receiving a third broadcast message sent by the third switch control apparatus, the third broadcast message comprising a third address identifier corresponding to the third switch control apparatus; and
   skip sending the third PLC signal if the third address identifier exists in the second reply message; or
   broadcasting the third PLC signal if the third address identifier does not exist in the second reply message.

4. A power distribution network system, the power distribution network system comprising:
   a user meter box comprising a first switch control apparatus and meters;
   a branch box coupled to the user meter box, the branch box comprising a second switch control apparatus;
   a power distribution cabinet coupled to the branch box, the power distribution cabinet comprising a third switch control apparatus;

a gateway device coupled to the power distribution cabinet; and a power transformer coupled to the power distribution cabinet, the power transformer being configured to provide a power supply to the power distribution cabinet;

the first switch control apparatus comprising a first switch and a first coupling circuit, the first coupling circuit being connected in parallel to inlet and outlet ends of the first switch, the first coupling circuit being configured to transmit a first PLC signal to the gateway device when the first switch is open;

the second switch control apparatus comprising a second switch and a second coupling circuit, the second coupling circuit being connected in parallel to inlet and outlet ends of the second switch, the second coupling circuit being configured to transmit a first PLC signal to the gateway device when the second switch is open;

the third switch control apparatus comprising a third switch and a third coupling circuit, the third coupling circuit being connected in parallel to inlet and outlet ends of the third switch, the third coupling circuit being configured to transmit a first PLC signal to the gateway device when the third switch is open.

5. The power distribution network system according to claim 4, wherein the first switch control apparatus is further configured to transmit a second PLC signal to the gateway device when the first switch is closed;

wherein the second switch control apparatus is further configured to transmit a third PLC signal to the gateway device when the second switch is closed; and wherein the third switch control apparatus is further configured to transmit a fourth PLC signal to the gateway device when the third switch is closed.

6. The power distribution network system according to claim 4, wherein the first switch control apparatus further comprises a first PLC module, the first PLC module being connected to an inlet end of the first coupling circuit and the first PLC module is connected to the inlet end of the first switch, the first PLC module being configured to send a fifth PLC signal to the gateway device; wherein the second switch control apparatus further comprises a second PLC module, the second PLC module being connected to an inlet end of the second coupling circuit and to the inlet end of the second switch, the second PLC module being configured to send a sixth PLC signal to the gateway device; wherein the third switch control apparatus further comprises a third PLC module, the third PLC module being connected to an inlet end of the third coupling circuit and to the inlet end of the third switch, the third PLC module being configured to send a seventh PLC signal to the gateway device.

7. The power distribution network system according to claim 4, wherein the first coupling circuit comprises a first signal transformer and first at least six safety capacitors; the first at least six safety capacitors are configured to select the first PLC signal of a specific frequency band, and the first signal transformer being configured to couple the selected first PLC signal to an outlet end of the first coupling circuit;

wherein the second coupling circuit comprises a second signal transformer and second at least six safety capacitors; the second at least six safety capacitors are configured to select the second PLC signal of a specific frequency band, and the second signal transformer being configured to couple the selected second PLC signal to an outlet end of the second coupling circuit;

wherein the third coupling circuit comprises a third signal transformer and third at least six safety capacitors; the third at least six safety capacitors are configured to select a third PLC signal of a specific frequency band, and the third signal transformer being configured to couple the selected third PLC signal to an outlet end of the second coupling circuit.

\* \* \* \* \*